April 16, 1929.  P. P. DEAN  1,708,941
OPERATING MECHANISM FOR VALVES AND THE LIKE
Original Filed March 7, 1924  3 Sheets-Sheet 3

INVENTOR
Peter P. Dean
BY
ATTORNEY

Patented Apr. 16, 1929.

1,708,941

UNITED STATES PATENT OFFICE.

PETER PAYNE DEAN, OF STAMFORD, CONNECTICUT, ASSIGNOR, BY MESNE ASSIGNMENTS, TO CUTLER-HAMMER MANUFACTURING COMPANY, A CORPORATION OF NEW YORK.

OPERATING MECHANISM FOR VALVES AND THE LIKE.

Application filed March 7, 1924, Serial No. 697,535. Renewed September 14, 1925.

This invention relates to driving mechanisms for valves and other devices.

The invention is particularly applicable to driving mechanisms of the character disclosed in the patent to Peter P. Dean, No. 1,245,574 issued November 6, 1917.

This patent discloses a driving mechanism including a rotatable element adapted to be restrained to establish a driving connection between driving and driven members, and to be released to effect substantially instantaneous release of the former member from the latter, and the present invention has among its objects to provide improved restraining means for such element.

Another object is to provide improved control means for such restraining means.

Various other objects and advantages of the invention will hereinafter appear.

The accompanying drawings illustrate an embodiment of the invention which will now be described, it being understood that the embodiment illustrated is susceptible of modification without departing from the scope of the appended claims.

In the drawings,

Fig. 6 is a diagrammatic view of the control means.

Figure 1:
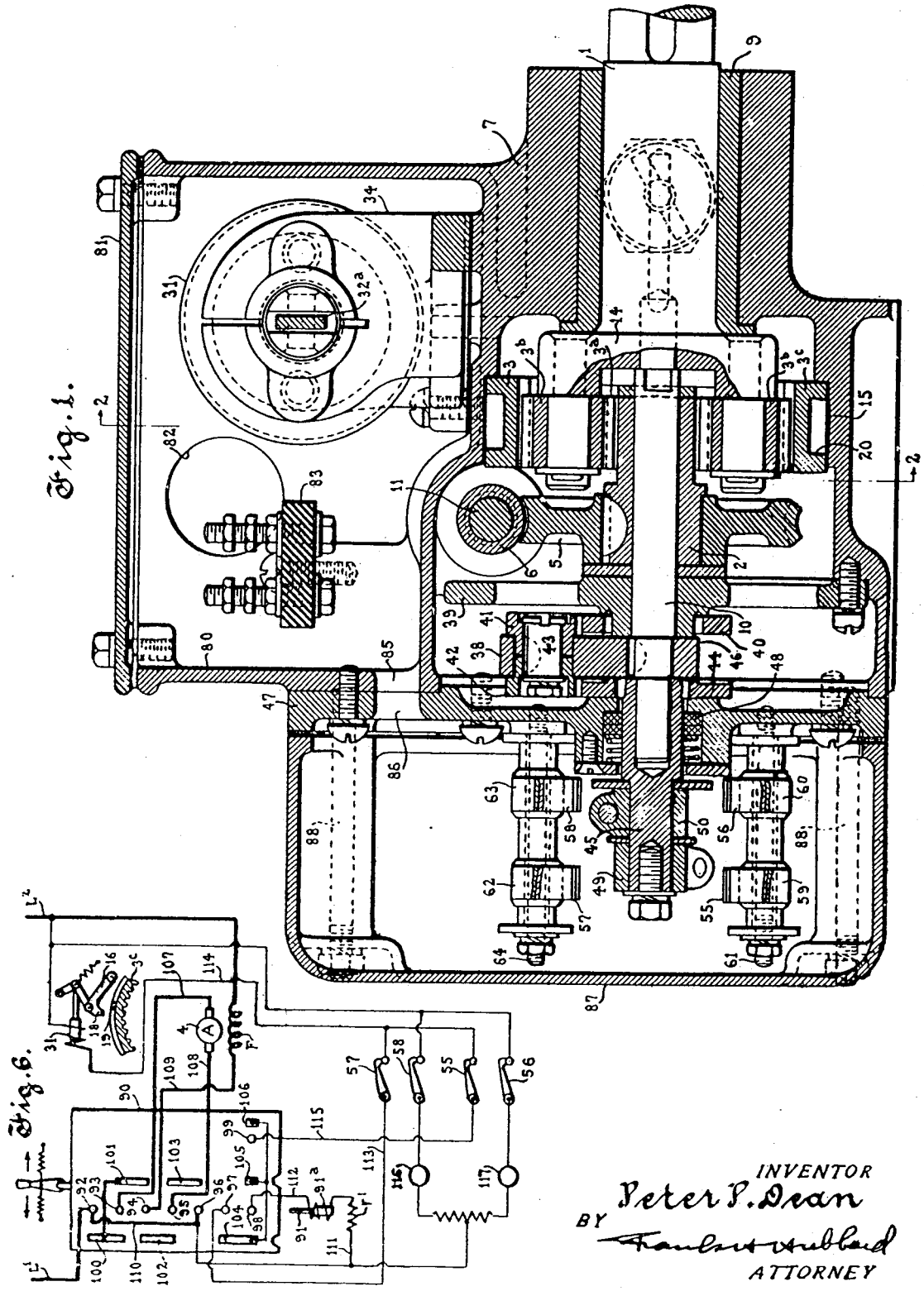
Figure 1 is a sectional view of a valve operating mechanism embodying the invention.
Figure 2:
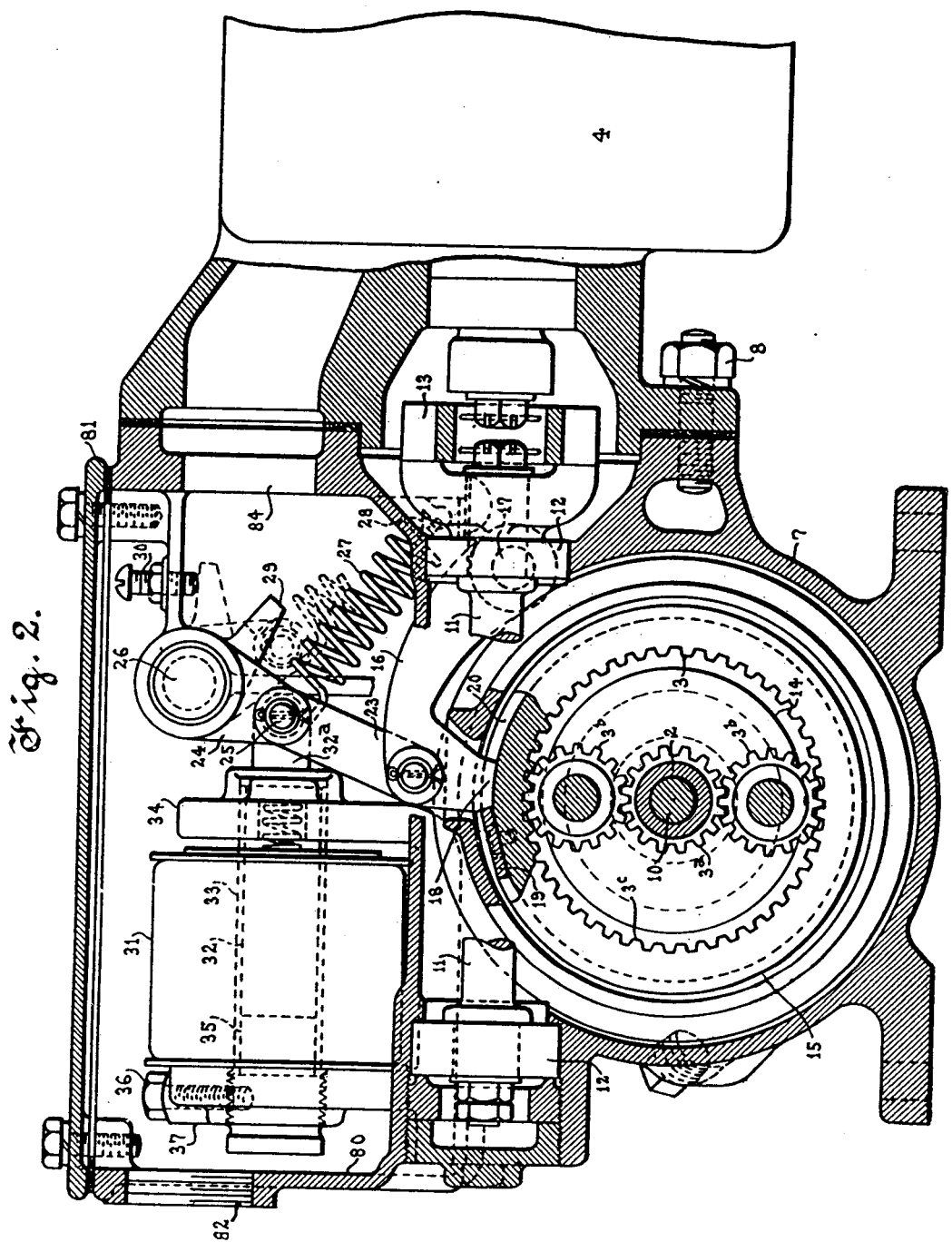
Fig. 2 is a sectional view taken substantially on line 2—2 of Fig. 1.

Referring to Figs. 1 and 2, the same illustrate a driving mechanism including a driven shaft 1, a driving member 2, a planetary speed reducing gear 3 for establishing a driving connection between said shaft and said member and a motor 4 operatively connected to the driving member 2 through the medium of a worm wheel 5 and a worm 6. These parts are all mounted within an enclosing casing 7 and the motor 4 is provided with a housing which is secured to one side of said casing by stud bolts 8.

The driven shaft 1 is rotatably mounted within a bearing 9 in casing 7 and the same has a shaft extension 10 fixed thereto upon which the driving member 2 is rotatably mounted. Worm wheel 5 is fixed to the driving member 2 while the worm 6 is fixed to a shaft 11 supported by bearings 12—12 in opposite walls of the enclosing casing and is connected to the shaft of motor 4 through the medium of a suitable coupling 13. The planetary gear 3 includes a pinion 3ª formed on the driving member 2, a plurality of pinions 3ᵇ carried by a disk 14 fixed to the driven shaft 1, and an internally toothed ring gear 3ᶜ, the pinions 3ᵇ being arranged between and in mesh with the pinion 3ª and the ring gear 3ᶜ. Ring gear 3ᶜ is revolubly mounted in a bearing 15 on the interior of casing 7 (Fig. 1) and forms the aforesaid restrainable and releasable element of the driving mechanism. As is apparent, restraint of ring gear 3ᶜ renders the planetary gear effective as a driving connection between the driving member 2 and driven shaft 1 whereas release of said ring gear will permit rotation thereof for release of said driving member from said driven shaft.

In the respects above noted the driving mechanism is substantially the same as that disclosed in the aforementioned patent.

Figure 3:
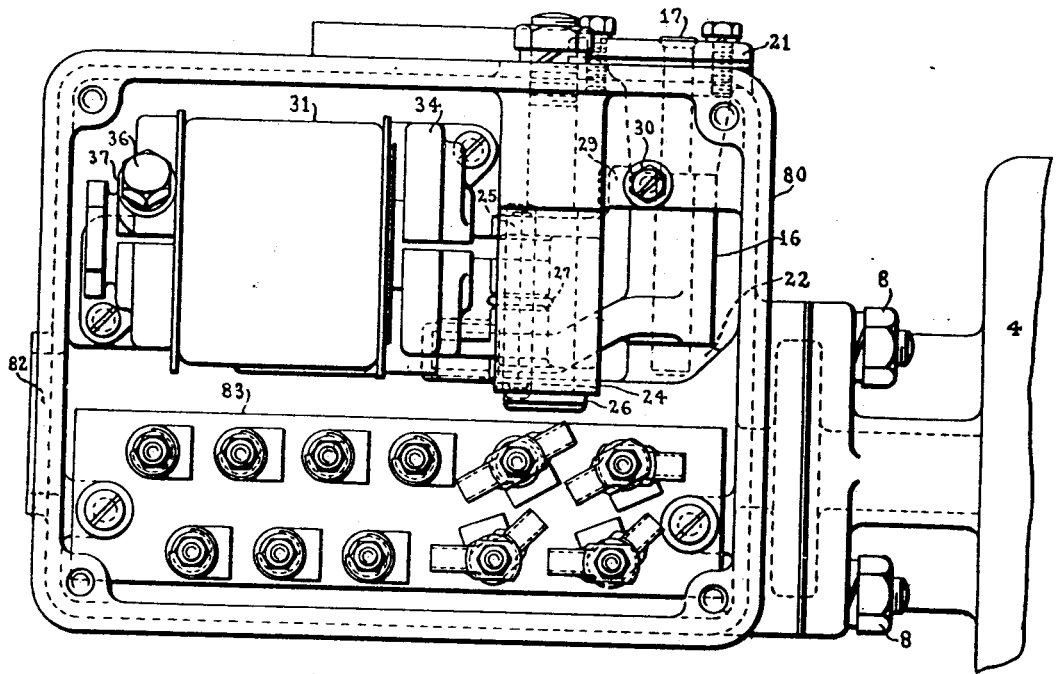
Fig. 3 is a plan view of certain of the parts shown in Fig. 1 with the cover therefor removed.

The means employed in this instance for restraining the ring gear 3ᶜ includes a latch 16 rotatably mounted upon a pin 17 and having a projection 18 adapted to cooperate with a stop 19 fixed to ring gear 3ᶜ within a circumferential groove 20 in the latter. As shown in Fig. 3, one end of pin 17 is fixed to a member 21 secured to casing 7 while the opposite end of said pin projects into an opening in a lug 22 on the interior of said enclosing casing.

Latch 16 is controlled through the medium of a toggle including a link 23 and a pivoted arm 24. As shown in Fig. 2 link 23 has one end pivotally secured to latch 16 while the opposite end thereof is pivotally secured to the free end of arm 24 by a pin 25. Arm 24 is rotatably mounted upon a fixed pin 26 and is biased to move in a counterclockwise direction (Fig. 2) under the action of a spring 27 having one end fixed to pin 25 and its opposite end fixed to a lug 28 on the interior of enclosing casing 7. Arm 24 is provided with a projection 29 which is arranged to abut an adjustable stop 30 to limit movement of said arm in a counterclockwise direction under the action of said spring.

The toggle operating means includes a winding 31 having a plunger 32, said plunger being slidable within a non-magnetic tubular member 33 supporting at opposite ends by a U-shaped magnet frame 34 fixed to casing 7. Plunger 32 is connected to pin 25 by a link 32ª, and, as hereinafter set forth, upon attraction thereof the same abuts a magnetic plug 35 in the left hand end of the tubular member 33. Plug 35 is threaded into frame 34 to provide for axial adjustment thereof and upon setting of said plug in a given position the same is held therein by screw bolt 36 threaded into a lug 37 on said frame.

From the foregoing it is apparent that upon energization of winding 31, the plunger 32 acts through the medium of the toggle to move latch 16 to a position wherein the projection 18 is located in the path of stop 19 to provide for restraint of ring gear 3ᶜ, and upon deenergization of said winding the spring 27 acts to break the toggle for release of said latch. Plug 35 is adjusted to limit movement of the plunger 32 to a position wherein the arm 24 and link 23 of the toggle are slightly out of alinement to provide for breaking of the toggle under the action of a relatively slight pull by spring 27. Furthermore, it should be noted from Fig. 1 that the cooperating faces of latch projection 18 and stop 19 are so shaped that upon restraint of ring gear 3ᶜ said faces tend to force latch 16 upwardly and such faces are so designed that the upward force on said latch is sufficient to break the toggle upon deenergization of winding 31 even though spring 27 fails to act.

The control means for solenoid 31 includes a limit switch mechanism mounted on one side of the enclosing casing 7, such mechanism being driven from the shaft extension 10 of the driven shaft 1 through the medium of an epicyclic reduction gear 38. As best shown in Fig. 1, shaft extension 10 is journaled within an opening in a plate 39 fixed to lugs on the interior of the enclosing casing 7 and the epicyclic reduction gear includes a spur gear 40 fixed to said plate, pinions 41 and 42 fixed to a pin 43, the former pinion meshing with spur gear 40 and the latter meshing with a spur gear 44 fixed to a shaft 45. Pinions 41 and 42 are rotatably mounted within an opening in an arm 46 fixed to shaft extension 10 and the relative pitch diameters of the several gears of the epicyclic reduction gear is such that upon rotation of said arm with shaft 10, the pinions 41 and 42 cooperate with gears 40 and 44 to drive shaft 45 from shaft 10 at a greatly reduced speed. Shaft 45 is provided with a bore for receiving the end of shaft extension 10 and the same extends through an opening in a plate 47 fixed to casing 7, such opening being provided with a packing gland 48. Shaft 45 carries a pair of cam members 49 and 50, the former for controlling a contact element 51 and the latter for controlling a contact element 52. Each of the cam members 49 and 50 is provided with a split hub portion provided with a clamping screw and for a purpose hereinafter set forth each is adjustable to vary the angular positions thereof on shaft extension 45.

The contact elements 51 and 52 are rotatably mounted on pins 53 and 54, respectively, fixed to plate 47, and, as shown in Fig. 1, the former contact element is provided with a pair of contact fingers 55 and 56, while the latter is provided with a pair of contact fingers 57 and 58. Contact fingers 55 and 56 cooperate with insulated stationary contacts 59 and 60, respectively, mounted on a pin 61 fixed to plate 47 while contact fingers 57 and 58 cooperate with insulated stationary contacts 62 and 63, respectively, mounted on a pin 64 fixed to said plate. The contact fingers of each of the elements 51 and 52 are fixed to an insulating plate 65 mounted upon a supporting member 66, said supporting members being rotatably mounted upon the pins 53 and 54. Each of the supporting members 66 is provided with a projection carrying a roller 67, the roller associated with contact element 51 being arranged in the path of cam member 49 and the roller associated with contact element 52 being arranged in the path of cam member 50. Each of the contact elements is adapted to be locked in closed position by a latch 68 rotatably mounted upon a pin 69 fixed to plate 47 and each of said contact elements is biased toward open position and its associated latch towards locking position by a spring 70. Each of the springs 70 is held under compression between a lug 71 on its respective supporting member 66 and a projection 72 on its respective latch and each of the latches has a tripping member 73 associated therewith. The tripping members 73 are rotatably mounted on the pins 69 and each is provided with a downwardly extending projection 74 and an upwardly extending projection 75 adapted to engage an adjustable stop 76 on projection 72. The projection 74 associated with the latch of contact element 51 is arranged in the path of cam member 49 while the projection 74 associated with the latch of contact element 52 is arranged in the path of cam member 50 and each of the tripping members 73 is held in engagement with its respective stop 76 by a spring 77.

Figures 4, 5:
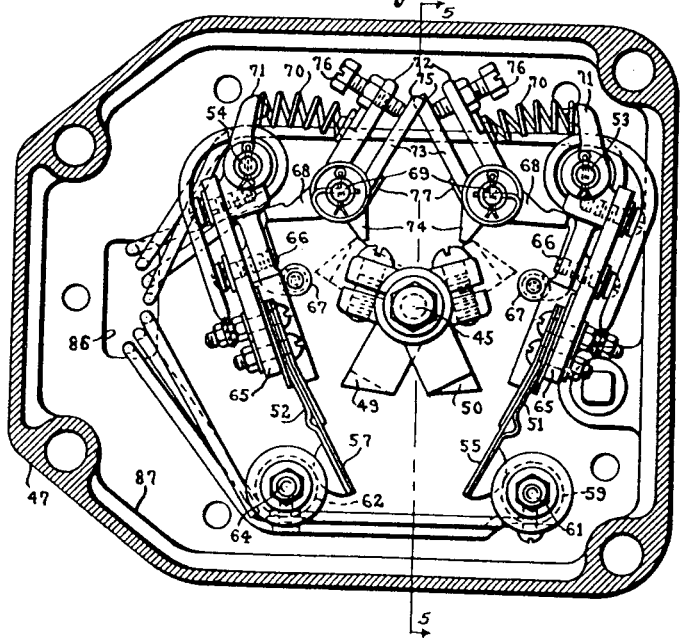
Fig. 4 is a plan view of the limit switch mechanism, the cover therefor being shown in section.
Fig. 5 is a sectional view taken on line 5—5 of Fig. 4.

The function and operation of the aforedescribed limit switch mechanism will now be more fully set forth. Assuming that both of the contact elements 51 and 52 are in closed position as shown in Fig. 4, it is apparent that upon clockwise rotation of shaft 45 to a given limit, cam member 50 will engage the projection 74 of tripping member 73 associated with contact element 52 to trip the latch associated with said element. Upon tripping of said latch contact element 52 is moved to open position under the action of spring 70 and will remain in such position pending return movement of the shaft 45 in a counterclockwise direction. Upon initial return movement of shaft 45 in a counterclockwise direction cam 50 releases the latch 68 of contact element 52 and said element is moved to closed position through engagement of said cam with the roller 67. Upon counterclockwise rotation of shaft 45 to a given limit, cam 49 engages the projection 74 of tripping member 73 associated with contact element 51 to provide for opening of said element and upon initial return movement of said cam in a clockwise direction the same releases the tripping member and engages the roller of said contact element to provide for closure thereof.

In connection with the foregoing it should be noted that the limits at which the contact elements 51 and 52 are moved to open position can be varied by varying the angular position of cams 49 and 50 on shaft 45 and that relatively fine adjustments of such limits can be made by adjusting stops 76 to vary the angular position of the projections 74 with respect to their associated latches.

The toggle operating mechanism is surrounded by walls 80 on one side of enclosing casing 7 and a cover plate 81 is fixed to said walls to enclose such mechanism. One of the walls 80 is provided with opening 82 for receiving the control conductors and an insulating panel 83 is mounted within the walls 80 and is provided with terminals to be connected to such conductors and also to the motor terminals and to the terminals of the aforedescribed limit switch mechanism. The motor terminals are passed through an opening 84 in one of the walls 80 while the limit switch terminals are passed through an opening 85 in one of said walls and a communicating opening 86 in plate 47. The limit switch mechanism is enclosed by a box-shaped casing 87 which is fixed to plate 47 by bolts 88.

Referring to Fig. 6, the driving motor 4 is diagrammatically shown as provided with an armature A and a series field winding F and a drum controller 90 is provided for controlling said motor and for also controlling the winding 31 of the latching mechanism through the medium of contact fingers 55 and 57 of the aforedescribed limit switch mechanism. Drum controller 90 has an intermediate "off" position and extreme "on" positions and the same is biased toward the former position and is provided with a magnetic latching device 91 for holding the same in either of its extreme "on" positions. Said drum controller includes a series of stationary contacts 92 to 99 inclusive, and cooperating movable contacts 100 to 106, inclusive, certain of said movable contacts being adapted to cooperate with certain of said stationary contacts to establish reverse connections for motor 4 and certain other being adapted to cooperate with certain of said stationary contacts to establish energizing circuits for the winding 31 of the valve operating mechanism through limit switch contacts 55 and 57 selectively and to include the winding $91^a$ of the controller latching device in such circuits.

Assuming that the controller is moved towards the right from the position shown, motor 4 is energized by a circuit extending from line $L'$ through contacts 92, 100 and 93 by conductor 107 through the armature A by conductor 108 through contacts 95, 102 and 94 by conductor 109 through the field winding F to line $L^2$. Also upon establishment of the aforedescribed motor connections the winding $91^a$ of the controller latching device and the winding 31 of the valve operating mechanism are energized by a circuit extending from line $L'$ to contact 92 by conductors 110 and 111 through a resistance $r'$ to and through winding $91^a$ by conductor 112 through contacts 98, 104 and 97 by conductor 113 through limit switch 57 and by conductor 114 through the winding 31 to line $L^2$. Thus immediately upon establishment of the aforedescribed motor connections, the latching device 91 is energized to hold the controller in its extreme right hand operative position while the winding 31 is energized to hold the latch 16 in a position for restraint of the ring gear $3^e$ of the driving mechanism. Assuming that establishment of the aforedescribed motor connections effects operation of the motor in a direction to effect opening of the valve and that the contact element 57 is arranged to open upon opening of the valve, it is apparent that immediately upon opening of the valve, said contact element effects deenergization of winding 31 for interruption of the driving connection between the motor and the driven shaft and also effects deenergization of the latching device 91 to provide for the return of the controller 90 to off position. Upon movement of the controller 90 towards the left from the position shown, the motor 4 is energized to operate in a reverse direction the energizing circuit therefor then extending from line $L'$ to contact 92 by conductor 110 through contacts 96, 103 and 95 by conductor 108 through the armature A by conductor 107 through contacts 93, 101 and 94, by conductor 109 through the field winding F to line $L^2$. Upon establishment of the aforedescribed reverse power connections for the motor, winding 31 of the valve operating mechanism and winding 91ª of the controller latching device are energized by a circuit extending from line L' through the winding 91ª as already traced through contacts 98 and 105, 99 and 106 by conductor 115 through limit switch 55 and by conductor 114 through the winding 31 to line L². Winding 31 is thus energized to effect the restraint of ring gear 3ᶜ while winding 91ª of the controller latching device is energized to restrain said controller in its operative position. Upon closure of the valve contact 55 of the limit switch opens to deenergize windings 31 and 91ª for interruption of the driving connection and return of the controller to off position.

In connection with the foregoing, it should be noted that under no voltage conditions winding 91ª is deenergized to permit return of the controller to off position while winding 31 is deenergized to interrupt the driving connection. Thus upon return of voltage in the supply circuit it is necessary to move the controller manually into an operative position to continue the operation of the valve operating mechanism. Furthermore, it should be noted that upon opening of either of the limit switches the winding 31 is deenergized even though the controller fails to return to off position.

The controller 90 may be operated to stop and start the motor at will between limits and to indicate the position of the valve, lamps 116 and 117 are provided. Lamp 116 is connected between lines L' and L² through the limit switch contact element and hence it will be energized whenever said element is closed and deenergized upon opening of said element while lamp 117 is connected between lines L' and L² by limit switch contact element 56 to be controlled thereby in the same manner. Thus energization of both of lamps 116 and 117 will indicate closure of both of the limit switch contact elements 56 and 58 and thereby indicate intermediate positioning of the valve whereas deenergization of the lamps will indicate opening of their respective limit switches and thereby indicate positioning of the valve at corresponding limits.

What I claim as new and desire to secure by Letters Patent is:

1. In combination, a reversible driving element, an element to be driven thereby in opposite directions, a driving connection between said elements including a member to be respectively restrained and released to render said connection effective and ineffective, a control part for said member movable to one position to restrain the same and to another position for release thereof and means for moving said part between the aforesaid positions, said means including an electromagnet and a toggle operating connection between said magnet and said control part.

2. In combination, a reversible driving element, an element to be driven thereby in opposite directions, a driving connection between said elements including a member to be respectively restrained and released to render said connection effective and ineffective, a pivoted latch movable into and out of engagement with a part fixed to said member to restrain and release the latter, a toggle adapted to be set to move said latch into engagement with said part and to be broken to move said latch out of engagement with said part and an electromagnetic operating device for said toggle.

3. In combination, power driving means, a driven member, a planetary gear driving connection therebetween including a revoluble gear member to be restrained and released to render said connection effective and ineffective, a part fixed to said gear member, a pivoted latch for restraining and releasing said part, and operating means associated with said latch including an electromagnet and a toggle operating connection between said magnet and said latch.

4. In combination, power driving means, a driven member, a planetary gear driving connection therebetween including a revoluble gear member to be restrained and released to render said connection effective and ineffective, a pivoted latch associated with said gear member, said latch being movable in opposite directions to restrain and release said member, a toggle associated with said latch including parts adapted to be moved into substantial alinement for movement of said latch into engagement with said gear member and an electromagnetic operating device associated with said toggle for moving the parts thereof into substantial alinement, said device including a winding, a plunger therein operatively connected to said toggle and adjustable limit means for varying the stroke of said plunger.

5. In combination, a reversible driving element, an element to be driven thereby, a planetary gear driving connection therebetween including a revoluble gear member to be restrained and released to render said connection effective and ineffective, a pivoted latch associated with said member movable in opposite directions to restrain and release the same, an operating toggle associated with said latch, a winding associated with said toggle for moving the same in a direction to effect restraint of said gear member by said latch and a spring associated with said toggle for moving the same in an opposite direction.

6. In combination, driving and driven elements, a driving connection therebetween, including a member to be respectively restrained and released to render said connection effective and ineffective, electromagnetic restraining means for said member and control means for said restraining means including a pair of limit switches to be driven from said driven member and a control device adapted to energize said electromagnetic device through said limit switches, selectively.

7. In combination, an element to be driven, reversible power driving means therefor to operate the same in opposite directions, a driving connection between said element and said means including a member requiring restraint to render said connection effective, an electromagnetically controlled restraining device for said member, a pair of limit switches to be controlled by said driven member, and a controller for establishing reverse power connections for said driving means, said controller being also adapted to establish an energizing circuit for said electromagnetic restraining device through said limit switches, selectively.

8. In combination, an element to be driven, reversible power driving means therefor to operate the same in opposite directions, a driving connection between said element and said means including a member requiring restraint to render said connection effective, an electromagnetically controlled restraining device for said member, a pair of limit switches to be driven from said driven member and a controller having an intermediate "off" position and extreme "on" positions, said controller being adapted in said latter positions to establish reverse power connections for said driving means and being also adapted to establish energizing circuits for said restraining device through said limit switches selectively.

9. In combination, an element to be driven, reversible power driving means therefor to operate the same in opposite directions, a driving connection between said element and said means including a member requiring the restraint to render said connection effective, an electromagnetically controlled restraining device for said member, a pair of limit switches for controlling said electromagnetic restraining means, said limit switches having an operating part associated therewith to be driven from said driven member and an epicyclic reduction gear between said operating part and said driven member.

10. In combination, an element to be driven, reversible power driving means therefor to operate the same in opposite directions, a driving connection between said element and said means including a member requiring restraint to render said connection effective, an electromagnetically controlled restraining device for said member, a pair of control switches for said restraining device, a revoluble control element for said switches arranged in alinement with said driven member and an epicyclic reduction gear between said element and said driven member.

11. In combination, an element to be driven, reversible power driving means therefor to operate the same in opposite directions, a driving connection between said element and said means including a member to be restrained to render said connection effective and to be released to render said connection ineffective, an electromagnetically controlled restraining device for said member, a pair of limit switches, a controller biased towards an intermediate "off" position and movable in opposite directions into extreme "on" positions, said controller being adapted to selectively establish reverse power connections for said driving means in said extreme positions and being also adapted to establish energizing circuits for said restraining device through said limit switches selectively and electromagnetic means to be included in the latter circuits for restraining said controller in the extreme "on" positions thereof.

12. A unitary driving mechanism for valves and the like comprising a driven member, a relatively high speed driving motor and a speed reducing driving connection therebetween having an electromagnet to hold certain parts of said connection in coacting relation, said connection being rendered ineffective by separation of said parts and said parts having cooperating faces to effect separation thereof upon deenergization of said electromagnet for substantially instantaneous release of said driven member.

13. In a driving mechanism for valves and the like in combination, a driven member, a relatively high speed driving motor and a speed reducing driving connection therebetween having an electromagnet to hold certain parts of said connection in coacting relation subject to release upon deenergization of said electromagnet to render said connection ineffective, one of said parts of said connection being rotatable and being at all times subjected to the driving force of said motor and said parts having engaging surfaces acting under the influence of said rotatable part to force said parts out of coacting relation when said electromagnet is deenergized.

14. A driving mechanism for valves and the like comprising a driven member, a relatively high speed driving motor and a speed reducing driving connection therebetween having parts to be engaged to render said connection effective and disengaged to render said connection ineffective and having an electromagnet to hold said parts in engagement subject to release upon deenergization of said electromagnet, said parts having cooperating faces whereby movement of one part tends to effect disengagement of said parts.

15. A driving mechanism for valves and the like comprising a driven member, a relatively high speed driving motor, and a speed reducing driving connection therebetween having an electromagnet and parts under control by said electromagnet to be engaged to render said connection effective and disengaged to render said connection ineffective, said parts having coacting surfaces whereby movement of one tends to effect disengagement of said parts and whereby initial and continued engagement of said parts is dependent upon energization of said electromagnet.

In witness whereof, I have hereunto subscribed my name.

PETER PAYNE DEAN.